Sept. 29, 1925.
W. E. WILLIAMS
AIR VALVE DEVICE USED IN CONNECTION WITH DISK
AND OTHER WHEELS FOR AUTOMOBILES
Filed Jan. 29, 1920
1,555,049
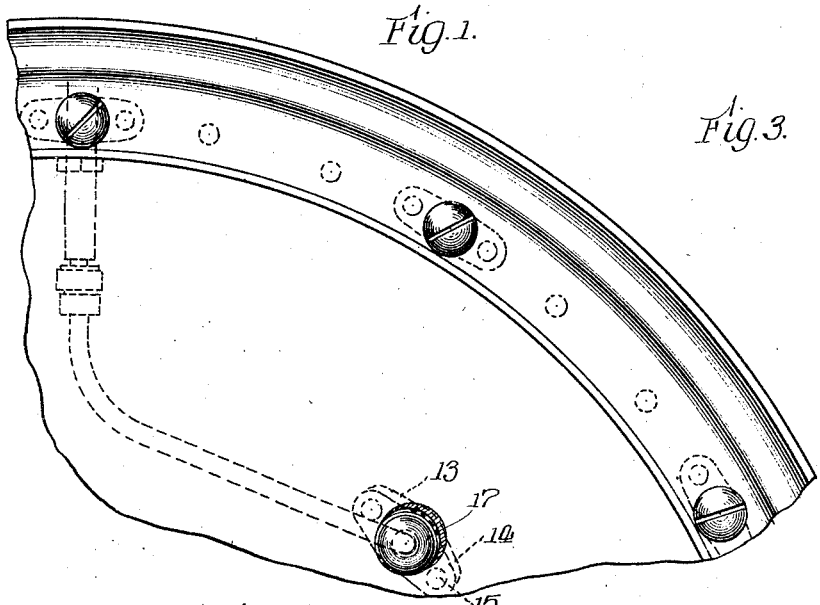
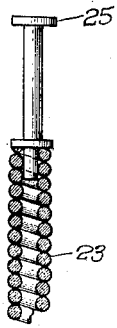
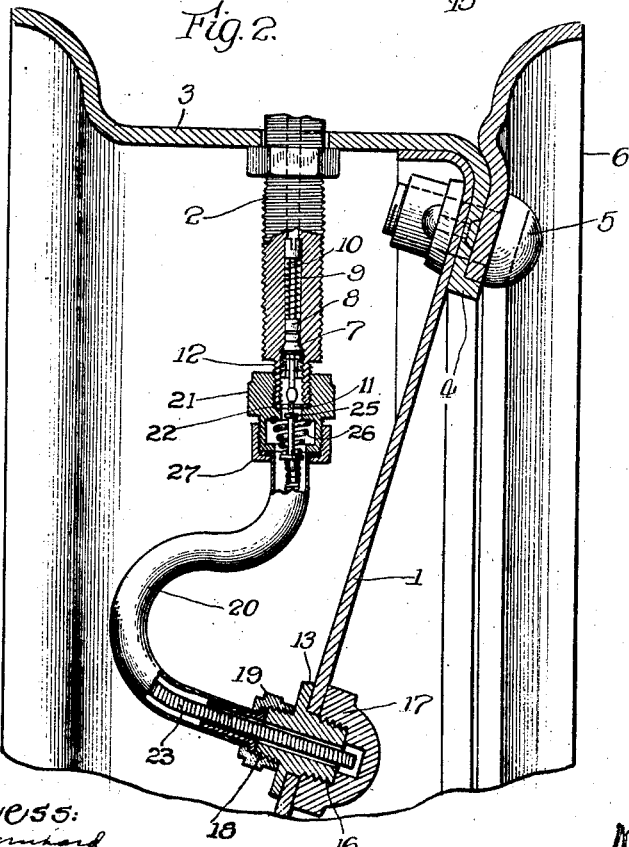
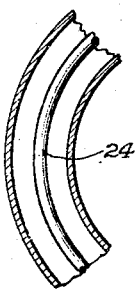
Inventor:
W. E. Williams
Witness:

Patented Sept. 29, 1925.

1,555,049

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

AIR-VALVE DEVICE USED IN CONNECTION WITH DISK AND OTHER WHEELS FOR AUTOMOBILES.

Application filed January 29, 1920. Serial No. 354,946.

*To all whom it may concern:*

Be it known that I, WILLIAM ERASTUS WILLIAMS, a citizen of the United States, a resident of Chicago, in the county of Cook and State of Illinois, have invented a new and useful Improvement in Air-Valve Devices Used in Connection with Disk and Other Wheels for Automobiles, of which the following is a specification.

My invention relates to the use of pneumatic tires upon what are known as disk wheels, but it may also be used with other types of wheels.

With a disk wheel it is desirable to have a smooth clean surface for the disk, and it is also desirable with some designs of wheels to have the disk approach near the front face the wheel. With pneumatic tires the air valve stem usually extends down into the central plane of the wheel and the valve location of this stem is usually in the center of the wheel and this brings it inside of the disk at the front or the rear as the case may be. With a front disk access is usually had to the valve stem from the rear of the disk, or through a gated opening of some sort.

In either case these arrangements are undesirable since the gate, if it is used, is a sort of a rattle trap and collects dirt around the seal which induces corrosion and makes a bad appearance.

Obtaining access to the valve stem from the rear of the wheel when the wheel is on the car, is a troublesome operation, as the mud guards, brake drums and springs make it inconvenient to get in from the inside.

Access to the valve stem is necessary not only to inflate and deflate the tire, but also to test the pressure carried within the tire with a pressure gauge. In so far as inflating the tire only is concerned, it might only be necessary to extend a tube from the end of the normal valve stem to some location on the front face of the wheel, but this would not permit the tire to be deflated nor would it allow the pressures to be measured through this added tube, since the valve which controls the entrance through the valve stem to the tire is controlled by a little valve in the stem itself.

The object of my invention is to provide an extension or connection, from the normal valve stem of the tire to the front face of the wheel, that will permit inflation or deflation and the measuring of pressures from the outside of the wheel in the same manner as might be done directly at the valve stem itself.

The invention is set forth in the claims.

Reference will be had to the accompanying drawings, in which Figure 1 shows a section of a disk wheel in front elevation.

Figure 2 shows a sectional view, parts being broken away to show construction of devices in different planes.

Figure 3 shows a sectional detail on a larger scale than is shown in the other figures.

Figure 4 shows a modified form of one of the details.

In the drawing 1 indicates the disk of a single disk automobile passenger car wheel, or a wheel upon which there is carried a pneumatic tire.

The tire itself is not shown in these drawings, but the valve stem thereof is shown and is indicated by 2. This stem passes down thru the face of the main rim 3 of the wheel in the ordinary manner for devices of this type.

The rim of my wheel is a special shaped rim and is provided with an inward-projecting flange 4 to which there is secured by screws 5 the supplemental side flange 6. The flange 4 is secured directly to the disk 1 forming the wheel.

Within the valve stem 2 there is provided the ordinary valve arrangement used with pneumatic tire valve stems and it consists essentially of two valve closure blocks, one of them indicated by 7, which is the fixed block, and the other indicated by 8 which is the movable block and the latter is held normally closed by a spring 9 which slides over a valve stem 10, the lower end 11 of which extends down into the normal nipple 12 of the normal valve stem. This end 11 furnishes the means for lifting the blocks 8 and opening the passage way for deflating the tire or measuring the pressure contained therein.

I provide a fixture 13, secured to my disk, by means of the lugs 14 and the rivets 15, fastened into the disk 1 of the wheel and provided with a threaded nipple end 16 extending to the outer face of the wheel. This nipple end is covered by a cap 17 for the purpose of protecting the same.

On the other or inside face of the fixture 13 I provide a nipple end 18 to which there is affixed a union 19 which connects a curved pipe 20, which extends up to the valve stem and is connected thereto through the union 21. A tight closure is effected in this union by means of a washer 22. On the inside of the pipe 20 I have a flexible push rod or sliding member 23 shown on a large scale in Figure 3. This member slides within the tube 20 and simply serves as an extension as it were of the end 11 of the valve rod 10. This flexible connection is made of a piece of wire in coil spring shape, coiled tightly on itself, so that it may move slightly within the tube 20 and accommodate itself to the curves of the tube.

In place of the solid coil as indicated by 23 I may use a flexible wire as indicated by 24 in Figure 4, the point being only to have a connection that will serve to push open the valve in the stem when access is had to the outer end of the extension on the front face of the wheel.

When the tire is to be removed from the wheel the union 21 is loosened from the nipple end 12 and in this work the bent tube 20 is sufficiently flexible to allow this to be connected and disconnected conveniently. Thus when the tire is freed from the wheel the valve stem is in its normal state. It is in its normal state at all times in any case, the only difference being that I have provided means, through the flexible member 23, of unseating the valve from the front face of the wheel.

This flexible connection 23 or its substitute, the wire 24, will be provided with a head 25 adapted to register on the end 11 of the valve rod 10. In the normal use of my device, the operator simply removes the cap 17 and applies to the nipple 16 the ordinary appliances that he would use otherwise were he to have direct access to the valve stem 2 of the tire itself.

I have shown the location of my fixture 13 as down in more or less a midway zone between the hub and the rim, but the location of this fixture is obviously not necessarily at the point selected for its illustration, the point being to have free access from the front face of the wheel to a nipple which connects to the valve stem in a manner that all the functions of inflating, deflating and measuring pressures may be conducted from the front face of the wheel, which is a great desideratum.

For the purpose of holding the member 23 normally out of engagement with the end 11 of the valve stem 10 I provide a small coil spring 26 within the upper end 27 of the tube 20, which normally holds the member 23 out of engagement to prevent accidental deflation of the tire by the road shocks and centrifical action of the wheel when running.

This coil spring 26 is held within a secondary union member 27 which is a part of the main union 21 and is normally tightly secured on to the main union 21 and is not detached in the ordinary removal of the tire from the wheel.

What I claim is:—

1. In devices of the class described, the combination with a tire valve stem, of a flexible stem extension adapted to terminate at the front face of a wheel when in use, and a flexible pusher member, for opening a valve in said stem, extending within said extension from its outer terminal without materially obstructing the passage in which it lies.

2. The combination with a tire valve and its normal stem, of a fixture adapted to be secured in position at the front face of a wheel, a flexible stem extension having one end connected to said fixture, and a loosely fitting, valve-actuating pusher coil extending inwardly in said extension from said fixture, without closing the passage in which it lies.

3. The combination with a wheel provided with a tire valve and stem, of a tubular stem-extension having its outer end fixed at the outer face of the wheel, and a valve actuating flexible pusher member extending in said extension from said outer end without closing the passage in which it lies.

4. The combination with a wheel having a tire valve and stem, of a fixture at the face of the wheel, a tube leading from said stem to said fixture, a sliding valve-actuating member enclosed in said tube, and a spring normally holding said member out of engagement with the valve.

5. The combination with a disk wheel having at its face a fixture provided, like a common valve stem, with a nipple accessible from the wheel's outer side, of a tire valve and its stem, a flexible tube extending from said fixture to said stem and detachably coupled to both and a flexible pusher normally projecting from said nipple and extending inwardly therefrom, in the extension, for opening the valve in the stem.

6. In apparatus of the class described, the combination with a disk wheel provided with a tire valve and normal valve stem and at its face with a tube-receiving nipple, of a tube detachably connecting the nipple to the valve stem, a flexible member sliding in the tube to actuate the valve and capable of bending to permit ready detachment of the tube from the sem, and means normally keeping the sliding member out of valve actuating position.

7. The combination with a flexible conduit adapted to be attached at one end to a valve stem, of a flexible member extending through said flexible conduit and adapted to cooperate with a tire valve to unseat the same.

Signed at Chicago, in the county of Cook and State of Illinois, this 26th day of January, 1920.

WILLIAM ERASTUS WILLIAMS.